US007421731B2

(12) United States Patent
Mitchell et al.

(10) Patent No.: US 7,421,731 B2
(45) Date of Patent: Sep. 2, 2008

(54) TRANSPARENT AUTHENTICATION USING AN AUTHENTICATION SERVER

(75) Inventors: Christopher E. Mitchell, Redmond, WA (US); Ryan W. Battle, Tampa, FL (US); Darren L. Anderson, Sammamish, WA (US); Joshua G. Poley, Redmond, WA (US); Greg A. Marks, Redmond, WA (US); John Hal Howard, Redmond, WA (US); Michael Wei-Quiang Guo, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 741 days.

(21) Appl. No.: 09/792,359

(22) Filed: Feb. 23, 2001

(65) Prior Publication Data

US 2002/0120867 A1    Aug. 29, 2002

(51) Int. Cl.
*G06F 7/04* (2006.01)
(52) U.S. Cl. .................. 726/3; 726/2; 726/4; 726/8; 726/9
(58) Field of Classification Search ................ 713/183, 713/170, 182; 709/229, 238–243; 726/13
See application file for complete search history.

(56) References Cited

U.S. PATENT DOCUMENTS

| 5,987,517 | A | * | 11/1999 | Firth et al. ................. 709/230 |
| 6,092,196 | A | * | 7/2000 | Reiche ....................... 713/200 |
| 6,192,361 | B1 | * | 2/2001 | Huang ........................... 707/9 |
| 6,412,009 | B1 | * | 6/2002 | Erickson et al. ............. 709/228 |
| 6,535,294 | B1 | * | 3/2003 | Arledge et al. ............. 358/1.15 |
| 6,947,903 | B1 | * | 9/2005 | Perry .......................... 705/28 |
| 2002/0194215 | A1 | * | 12/2002 | Cantrell et al. .............. 707/500 |

OTHER PUBLICATIONS devguru.com, ref #2 (http://www.devguru.com/Technologies/ecmascript/quickref/location.html, (2000).*
javascritp (http://web.archive.org/web/19990508133643/http://javascript.internet.com/user-details/browser-entry.html, 1999).*

(Continued)

*Primary Examiner*—Kambiz Zand
*Assistant Examiner*—Peter Poltorak
(74) *Attorney, Agent, or Firm*—Woodcock Washburn LLP

(57) ABSTRACT

A user, by way of a computing device, requests and receives content from a first server at the computing device. An authentication response is also received from the first server at the computing device of the user. The authentication response includes an address of the second server and an executable script. The computing device of the user executes the executable script by issuing a request to the second server for state information corresponding to the user, receiving the state information from the second server; and determining, based on the state information, whether the user is authenticated to the second server. If the user is not authenticated to the second server, the computer device of the user displays a login module that is visually associated with the first server. Such login module collects login information for authenticating the user to the second server. If the user is authenticated in the second server, the computing device of the user issues a request to the second server for vouching information for authenticating the user to the first server.

16 Claims, 3 Drawing Sheets

OTHER PUBLICATIONS cdeave.com, ref. #1 ("Mail a link", http://www.codeave.com/asp/code.asp?u_log=128, 2000).* http://web.archive.org/web/20000815062816/lc4.law5.hotmail.passport.com/cgi-bin/login.*

Korman (David P. Kormann and Aviel D. Rubin, "Risks of the Passport Single Signon Protocol", Computer Networks, Elsevier Science Press, vol. 33, pp. 51-58, 2000).*

Hall, (Marty Hall, "Core Web Programming", 1998, ISBN: 0136256666X, p. 918-919, p. 810-811, p. 1109, 1114-1116.*

Musciano, "HTML: the Definitive Guide Nutshell Handbook", ISBN: 9780596150044, 1998, 6 pages including a cover.*

Marable, B., et al., "Designing smart pop-up windows," *Web Techniques*, Jul. 1998, 65-69.

Tessier, T., "Sharing data between web page frames using JavaScript," *Dr. Dobb's Journal*, May 1996, 72-72, 74-75, 86-87.

Veer, E.A.V., Client-side JavaScript, JavaScript lets you keep client functions on the client, *Web Techniques*, Feb. 1997, 52.

U.S. Appl. No. 09/349,619, filed Jul. 8, 1999, Howard et al.

U.S. Appl. No. 09/350,018, filed Jul. 8, 1999, Howard et al.

* cited by examiner

TRANSPARENT AUTHENTICATION USING AN AUTHENTICATION SERVER

TECHNICAL FIELD

The invention relates to computer networks. In particular, the invention relates to signing into a network server on the computer network.

BACKGROUND OF THE INVENTION

With the increasing popularity of the Internet, more network servers require users to sign in thereto. Signing in has numerous benefits for both the user and the network server. The network server benefits by gaining information about the user. Such information may include the user's email address, name, geographical region, and commercial and/or personal preferences, etc. Accordingly, the network server may use such information in a variety of commercially beneficial ways.

The user benefits by having a more dynamic and personalized user experience. In this sense, the network server, as presented to the user in the form of a web page, may have a different 'look and feel' or different advertising based on the user's preferences, past experiences, etc. Thus, the site displays information more relevant to the user.

At least in some instances, a network server (first network server), when signing in a user, chooses to use another network server's (second network server) sign in methodology. This alleviates the first network server from creating and maintaining its own sign in process and allows the second network server to generate revenue through licensing its sign in methodology. However, a user attempting to sign into the first network server which is using the sign in methodology of the second network server, has heretofore been presented with a sign in screen that has the look and feel of the second network server and not of the first network server. This unexpected and potentially misleading situation may be upsetting to the user and detracts from the first network server's user experience. As a result, such situation can deter the first network server from using the second network server's sign in methodology.

Therefore, a need exists for a method and an apparatus for allowing a first network server to use the functionality of a second server's sign in methodology yet still maintain the look and feel of the first server during such sign in. That is, a need exists for an 'in-line' sign in method.

SUMMARY OF THE INVENTION

The present invention satisfies the aforementioned need by providing a method of in-line sign in that allows a user to sign into a first server based on a sign-in methodology of a second server. The method allows the first server to use, within its own user interface, the functional sign-in methodology of the second server. Such method provides a seamless and effective sign-in process for the user by not detracting from the user experience provided by the first server.

In the method, an authentication response, including an address of the second server and an executable script, is received from the first server at a computing device of the user. The executable script is then executed in the computing device. Executing the executable script includes issuing a request to the address of the second server for state information and receiving such state information from the second server. Then, based on the state information, the computing device determines whether the user is authenticated to the second server.

If the user is authenticated to the second server, the computer device issues a request to the second server for vouching information for authenticating the user at the computing device to the first server. If the user is not authenticated to the second server, the computer device displays a login module to collect login information to authenticate the user to the second server. The login module is presented to the user within the context of the look and feel of the first server web page. When the user enters their login information into the login module of the computer device, then the computer device will POST (HttpRequest) the information to the second server. Accordingly, the user is not startled or upset by the sudden appearance of a foreign web page such as that from the second server.

BRIEF DESCRIPTION OF THE DRAWINGS

Other features of the invention are further apparent from the following detailed description of the embodiments of the present invention taken in conjunction with the accompanying drawings, of which.

DETAILED DESCRIPTION OF THE INVENTION

In the present invention, a first server authenticates a user based on state information from a second server. In particular, a user at a computing device requests content from a first server. The user first receives an authentication response from the first server. The authentication response from the first server includes an address of the second server and an executable script. The computing device of the user, typically through a web browser, parses the authentication response and, in doing so, executes the executable script. Executing the script includes issuing a request to the second server for state information and receiving the state information from the second server. After receiving such state information, the computing device/browser determines, based on such state information, whether the user is authenticated to the second server.

If the user is authenticated to the second server, the computer device/browser issues a request to the second server for vouching information for authenticating the user to the first server. If the user is not authenticated in the second server, the computer device/browser displays a login module for collecting login information for authenticating the user to the second server. Importantly, the login module is presented to the user within the context of the look and feel of the first server web page. Accordingly, the user is not upset by the sudden appearance of a foreign web page such as that from the second server.

Figure 1:
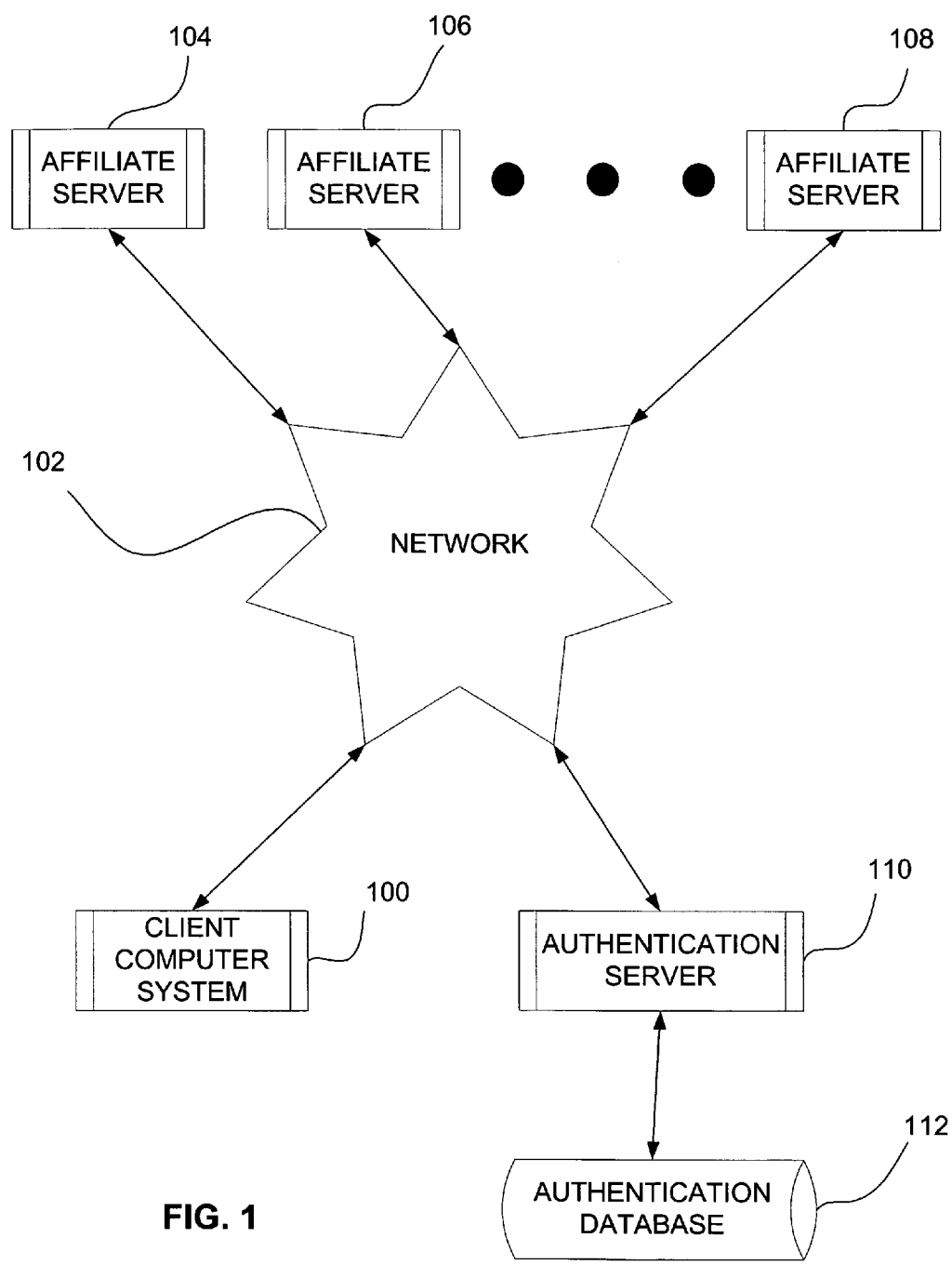
FIG. 1 is a block diagram of an exemplary networking environment in which aspects of the present invention may be implemented.

FIG. 1 illustrates an exemplary network environment in which aspects of the invention may be implemented. A client computer system 100 is coupled to a network 102. In this example, network 102 is the Internet (or the World-Wide Web). However, the teachings of the invention can be applied to any data communication network. Multiple affiliate servers 104, 106, and 108 are coupled to network 102, thereby allowing a user at a computing device or user computer system 100 to access web servers 104, 106, and 108 via the network. Affiliate servers 104, 106, and 108 are also referred to as "web servers" and "network servers". An authentication server 110 is also coupled to network 102, allowing communication between the authentication server and user computer system 100 and web servers 104, 106, and 108. Although referred to as an "authentication server", authentication server 110 is also a web server capable of interacting with web browsers and other web servers. In this example, data is communicated between the authentication server, user computer system, and web servers using the Hypertext Transfer Protocol (HTTP), a protocol commonly used on the Internet to exchange information. Other protocols may be used without departing from the scope of the present invention.

An authentication database 112 is coupled to authentication server 110. The authentication database 112 contains information necessary to authenticate users and also identifies which elements of the user profile information should be provided to a particular affiliate server when the user accesses the affiliate server. Although the authentication database 112 is shown separately from the authentication server 110, in other embodiments of the invention, the authentication database 112 is contained within the authentication server.

The term "affiliate server" is defined herein as a web server that has "registered" or otherwise established a relationship or affiliation with the authentication server 110. Each affiliate server 104, 106, and 108 includes a code sequence (not shown) that allows the affiliate server to share information with the authentication server 110 when a user (who is also registered with the authentication server) requests access to the affiliate server. Each affiliate server is assigned a unique ID, which the affiliate server transmits to the authentication server, thereby identifying itself to the authentication server.

Figure 2:
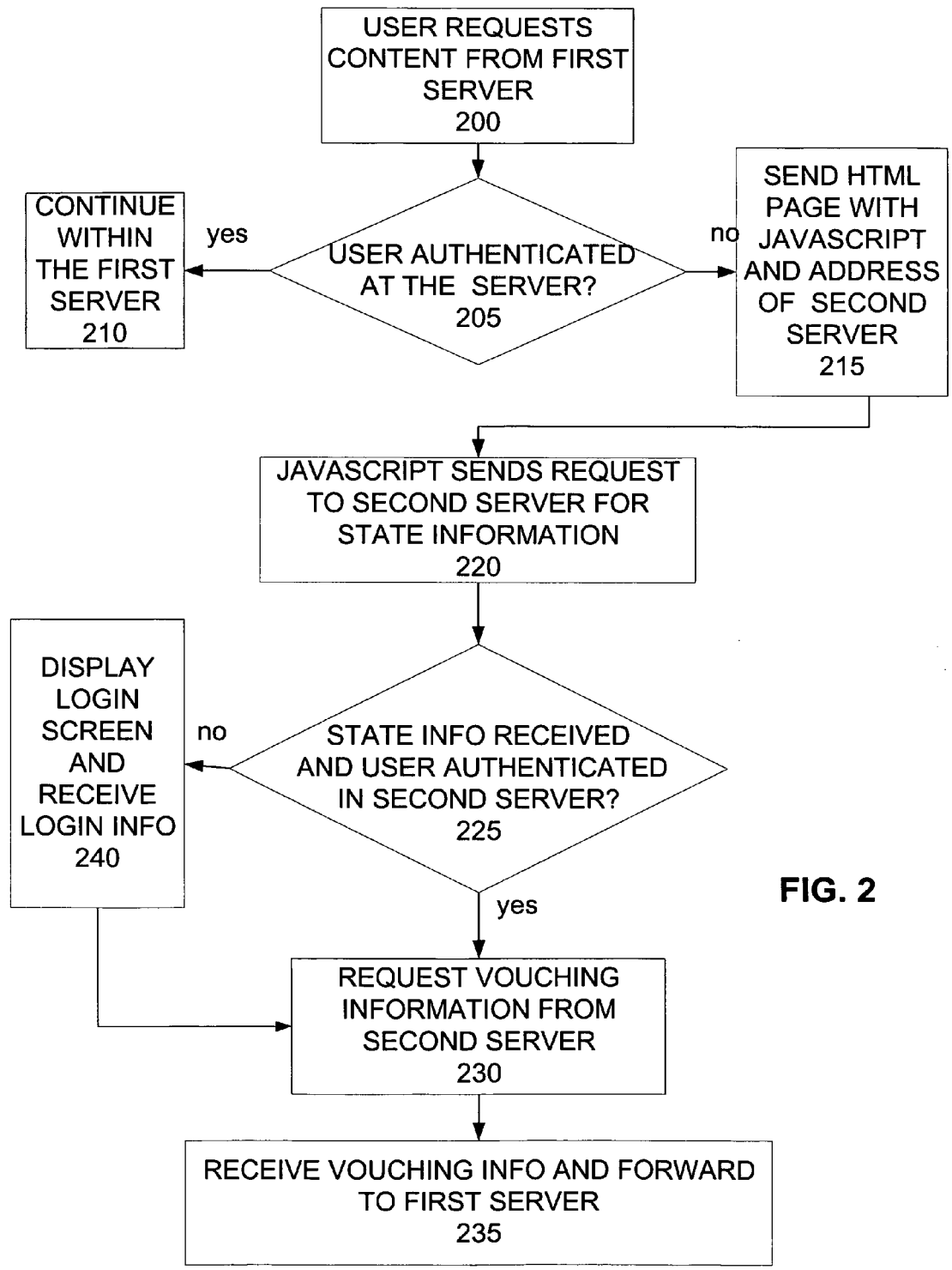
FIG. 2 is a flowchart illustrating the process of a user signing in to a first server using the authentication methodology of a second server in accordance with one embodiment of the present invention.

FIG. 2 is a flowchart illustrating the process of a user signing in to an affiliate server 104 using the authentication methodology of an authentication server 110 in accordance with the present invention. According to the present invention, at step 200, a client requests content from the affiliate server 104. Typically, content is requested by the user at the computer system 100 by either typing a URL of a network server or clicking on a hyper link associated with such URL.

The affiliate server 104 determines locally whether the user is already authenticated at such affiliate server 104 at step 205. In one embodiment of the present invention, if the user is authenticated at the affiliate server 104 using the authentication methodology of the affiliate server 104, the user may access the affiliate server 104 at step 210. However, if the user is not authenticated at the affiliate server 104, the affiliate server 104, in response to the user's request for content, sends the user's computer system an authentication response at step 215.

The authentication response may be in the form of an HTML page or a portion thereof, and may include, in pertinent part, a JavaScript tag and at least one executable script. The JavaScript tag includes an address of the authentication server 110 (whose authentication methodology is to be used by the affiliate server 104) having state information concerning the user. The at least one executable script may include or refer to an Application Program Interface (API) provided to the affiliate server 104 by the authentication server 110 and may contain at least one information segment. The information segment receives the state information for the user from the authentication server as will be described below.

After receiving the authentication response, the browser or the like on the user's computer system parses the authentication response. In doing so, at step 220, the browser encounters the JavaScript tag that directs the user's computer system 100 to the authentication server 110 to retrieve state information concerning the user. At this point, the computer system 100 passes state information to the authentication server 110. The state information is retrieved from the authentication server 110 and is sent to the user's computer system 100. The user's computer system 100 at step 225 receives such state information from the authentication server 110 and appropriately places the state information in the information segments in the executable script.

Importantly, and in accordance with one embodiment of the present invention, the affiliate server 104 incorporates the JavaScript tag and the executable scripts into the authentication response in any manner. In particular, the authentication response from the affiliate server 104 may be embodied within a web page having the look and feel of the affiliate server 104, even though information is being sent to and received from the authentication server 110. Thus, the affiliate server 104 can use the functionality of the authentication methodology of the authentication server 110, in any manner desired. To the user, the user experience does not change because the affiliate server 104 always maintains control of the user experience through the HTML page. As a result, a seamless sign-in process is provided to the user, i.e. the user is not displayed a screen from the authentication server 110 having a different look and feel. Therefore, to the user, it appears that the user's computer system 100 never left the affiliate server 104 even though the user's computer system 100 has contacted the authentication server 110 and employed the authentication methodology thereat on behalf of the affiliate server 104.

After the computer system 100 receives the state information from the authentication server 110, the browser of the computer system 100 executes the executable script using such state information. In one embodiment of the present invention, the executable script employs the received state information as input to functions associated with the aforementioned API's, where the functions result in an output that signifies whether the user is indeed authenticated by the authentication server 110. Such authentication is described more fully in U.S. patent application Ser. Nos. 09/349,619 and 09/350,018, which are hereby incorporated by reference in their entirety. Notably, an appropriate authentication process may be employed by the authentication server 110 and the executable script at the computer system 100 without departing from the scope of the present invention.

In one embodiment of the present invention, if the browser of the computer system 100 determines the client is indeed authenticated, the executable script may direct the user computer system 100 to the authentication server 110 to retrieve vouching information at step 230. The vouching information serves to represent to the affiliate server 104 that the user is in fact authenticated by the authentication server 110. In one embodiment, the vouching information is written by the authentication server 110 according to a secret shared with the affiliate server 104. The secret may be any appropriate secret without departing from the scope of the present invention.

Upon receipt of the vouching information, the browser of the computer system 100 forwards the same to the affiliate server 104 at step 235. As may appreciated, the affiliate server 104 employs the vouching information and the secret shared with the authentication server 110 to read the vouching information and after doing so the affiliate server 104 in fact signs in the user thereto. The aforementioned U.S. patent application Ser. Nos. 09/349619 and 09/350018, already incorporated by reference herein, describe the process as performed by the affiliate server 104 in more detail.

If the user is not authenticated at the authentication server 110, the executable script may direct the user computer system 100 to display a login screen for the user to input user information with regard to such authentication server 110, as at step 240. As may be appreciated, the inputted user information includes such items as a user identification and password with regard to the authentication server 110, and is forwarded by the browser on the computer system 100 to the authentication server 110.

The computing device 100 may then receive an acknowledgement from the authentication server 110 that the user is authenticated to the authentication server 104. In one embodiment the present invention, the acknowledgement is in the form of cookies or the like. However, other forms of acknowledgement may be used without departing from the scope of the present invention. Thereafter, the browser of the computer system 100 may direct the user computer system 100 to the authentication server 110 to retrieve vouching information and forwards the same to the affiliate server 104, in the manner of steps 230 and 235 as discussed above, and the affiliate server 104 signs in the user thereto. Once the user is logged into the authentication server 110, the affiliate server 104 may then send the content to the user in response to the user's original request.

Figure 3:
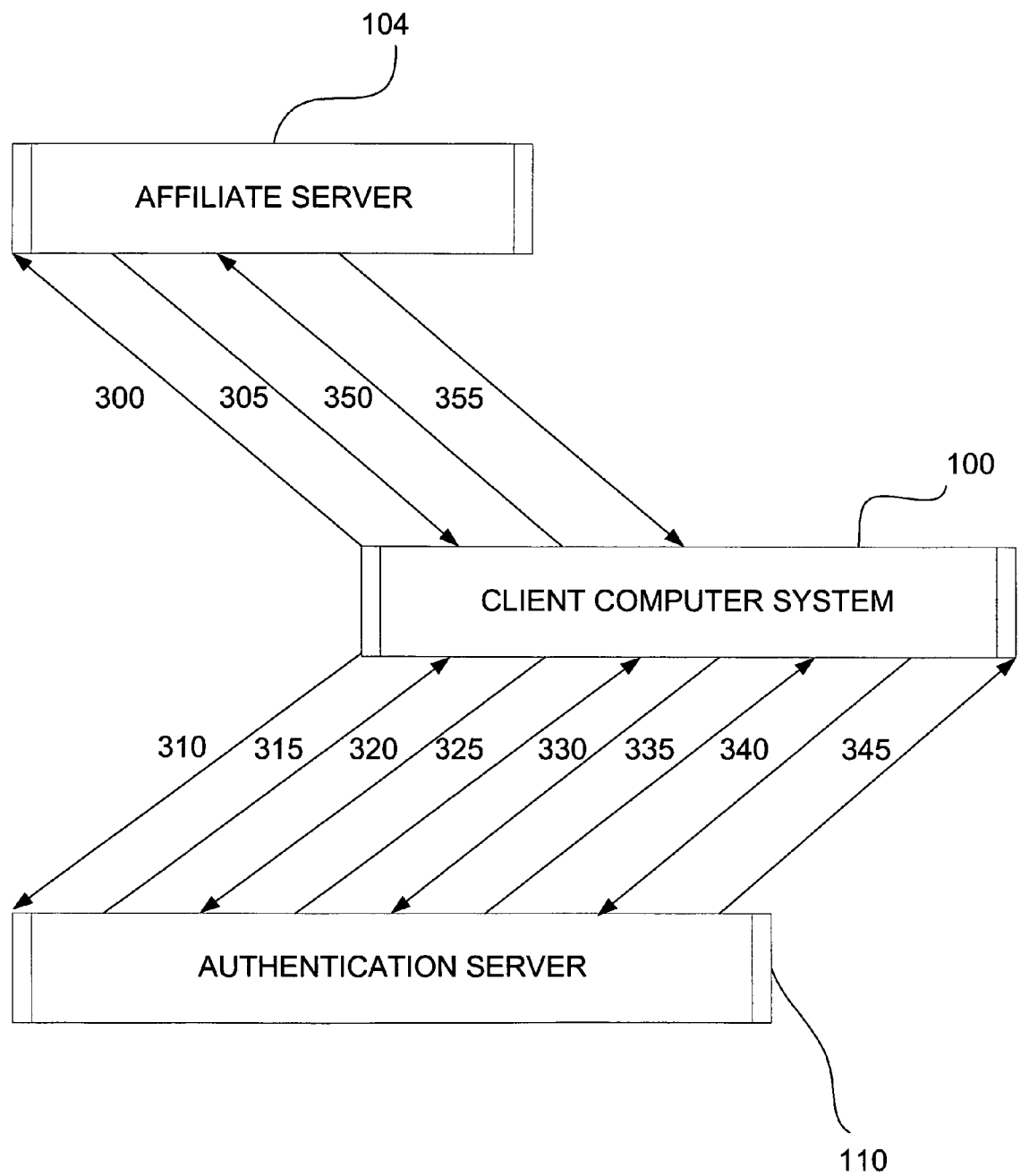
FIG. 3 is a block diagram illustrating the process of a user signing in to an affiliate server using the signing in methodology of an authentication server in accordance with one embodiment of the present invention.

As shown in FIG. 3, the method of FIG. 2 is shown in terms of the flow of data between the servers 104, 110 and the computer 100. As seen, a user at client computer system 100 requests content from the affiliate server 104 at step 300. If the user is authenticated at the affiliate server 104 then the user may enter a domain operated by the affiliate server 104. If not, and the affiliate server 104 determines the user needs to be authenticated, then at step 305, in response to the request for content, the affiliate server 104 sends the user's computer system 100 an authentication response as part of an HTML page.

The user computer system 100 parses the HTML page. In doing so, the JavaScript tag within the authentication response directs the user's computer system 100 to the address of the authentication server 110 at step 310 to retrieve state information concerning the user. The state information is then sent by the authentication server 110 to the client computer system at step 315. The client's computer system 100 receives state information from the authentication server 110 and executes the executable scripts based on the state information to determine if the user is already logged on to the authentication server 110. If the client is already logged on the authentication server 110, the user computer system 100 is directed by the executable script to the authentication server 110 at step 320 to retrieve the vouching information as at step 325.

If the client is not already logged on the authentication server 110, and in one embodiment of the present invention, the executable script causes the web browser to display a login screen for the user to input login information. Importantly, the login screen is constructed within the context of the look and feel of the site as operated by the affiliate server 104. The information collected through the use of the login screen is sent by the browser of the computer system 100 to the authentication server 110 at step 330 and the authentication server 110 returns the state information at step 335.

Thereafter, the browser requests vouching information from the authentication server at step 340 and receives the vouching information at step 345. The vouching information is then forwarded by the browser to the affiliate server at step 350 and the affiliate server 104 logs the user therein. The affiliate server 104 returns the information as originally requested by the user at step 355 which may be substantive in nature or may be an introductory splash screen or the like.

In the present invention, and as seen in FIG. 3, the affiliate server 104 and the authentication server 110 never communicate directly, at least when logging in the user to the affiliate server 104. Instead, all communications are through the user computer system 100. As may be appreciated, such an arrangement facilitates the use of cookies that are stored on the computer 100 to identify the user to both servers 104, 100. Nevertheless, the servers 104, 110 may communicate directly without departing from the scope of the present invention.

In the present invention, the in-line sign in process is characterized by the executable script and related items as sent by the affiliate server 104 to effectuate all communications between the computer system 100 and the authentication server 110. Thus, the user need not be bothered with such tasks and is in fact unaware that such communications are taking place. Thus, such sign in with the affiliate server 104 is seamless or nearly so, even with the involvement of authentication server 110. Moreover, even if the user must input information to be sent to the authentication server 110 as at step 240 of FIG. 2, such information is inputted into a page constructed to have the look and feel of the site operated by the affiliate server 104 so that the page is a view associated with the affiliate server 104 and the user is not started to see a different view from the authentication server 110 which has a different look and feel.

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

As should now be understood, the present invention provides a method of in-line sign in that allows a user to sign into a first server based on state information from a second server. The method allows the first (affiliate) server to use, within its own user interface, the functional sign-in methodology of the second (authentication) server. Changes could be made to the embodiments disclosed above without departing from the broad inventive concepts thereof. For example, the invention could be practiced on two unaffiliated servers rather than an authentication server and an affiliate server. It is understood, therefore, that the present invention is not limited to the particular embodiments disclosed, but it is intended to cover modifications within the spirit and scope of the present invention as defined by the appended claims.

The invention claimed is:

1. A method of seamlessly authenticating a user to a first remote server by way of a separate second remote server, the method comprising:

at a user computer, requesting content from the first remote server;

receiving an authentication response from the first remote server, the authentication response received in the form of an HTML page and including an address of the separate second remote server and an executable script containing information identifying a web-page view associated with the first remote server and an application programming interface (API) having an information segment; and executing the executable script by the user computer, the executable script including:

issuing a request to the second remote server for state information corresponding to the user;

receiving the state information from the second remote server, the state information received by the information segment of the API;

determining, based on the state information, whether the user is authenticated to the second remote server; and if the user is not authenticated to the second remote server:

displaying a login module for collecting login information for authenticating the user to the second remote server, wherein:

the login module is displayed by the executable script running on the user computer with the web page view associated with the first remote server based on the information in the executable script;

the first remote server selects and controls the webpage view of, and user experience with, the login module while information input therein is sent to and from the second remote server, the user therefore not seeing a view associated with the second remote server during user authentication;

the second remote server controls user authentication methodology; and user authentication occurs without direct communication between the first remote server and the second remote server.

2. The method of claim 1 wherein the login module is displayed according to information received with the authentication response from the first remote server.

3. The method of claim 1 further comprising, if the user is authenticated to the second remote server:

issuing a request to the second remote server for vouching information for authenticating the user to the first remote server.

4. The method of claim 3 further comprising, if the user is authenticated to the second remote server:

issuing a request to the second remote server for vouching information for authenticating the user to the first remote server;

receiving the vouching information;

forwarding the vouching information to the first remote server; and receiving the requested content from the first remote server.

5. The method of claim 1 comprising, if the user is not authenticated to the second remote server:

displaying the login module;

collecting the login information; and forwarding the collected login information to the second remote server.

6. The method of claim 5 comprising, if the user is not authenticated to the second remote server:

displaying the login module;

collecting the login information;

forwarding the collected login information to the second remote server; and receiving an acknowledgment that the user is now authenticated to the second remote server.

7. The method of claim 6 comprising, if the user is not authenticated to the second remote server:

displaying the login module;

collecting the login information; and forwarding the collected login information to the second remote server;

receiving an acknowledgment that the user has been authenticated to the second remote server;

issuing a request to the second remote server for vouching information for authenticating the user to the first remote server;

receiving the vouching information;

forwarding the vouching information to the first remote server; and receiving the requested content from the first remote server.

8. The method of claim 1 wherein all communication to and from the first and the second remote servers during user authentication occur through a computer system of the user.

9. A computer readable storage medium having stored thereon computer-executable instructions for seamlessly authenticating a user to a first server by way of a second server, the instructions organized into modules for execution on a user computer, the modules including:

a module for requesting content from the first server;

a module for receiving an authentication response from the first server, the authentication response comprising an HTML page including an address of the second server and an executable script containing information identifying a web-page view associated with the first server and an application programming interface (API) information segment, wherein the first server and the second server are separate remote servers; and a module for executing the executable script on the user computer, the executable script including:

a sub module for issuing a request to the second server for state information corresponding to the user;

a sub module for receiving the state information from the second server, the state information received by the information segment of the API; and a sub module for determining, based on the state information, whether the user is authenticated to the second server; and if the user is not authenticated to the second server:

a module for displaying a login module using the executable script running on the user computer for collecting login information for authenticating the user to the second server, wherein:

the login module is displayed with the web-page view associated with the first server based on the information in the executable script;

the first server selects and controls the web-page view of, and user experience with, the login module while information input therein is sent to and from the second server, the user therefore not seeing a view associated with the second server during user authentication;

the second server controls user authentication methodology; and user authentication occurs without direct communication between the first server and the second server.

10. The medium of claim 9 wherein the module for displaying a login module for collecting login information for authenticating the user to the second server displays the login module according to information received with the authentication response from the first server.

11. The medium of claim 9 further comprising, if the user is authenticated to the second server:

a module for also issuing a request to the second server for vouching information for authenticating the user to the first server.

12. The medium of claim 11 further comprising, if the user is authenticated to the second server:

a module for receiving the vouching information;
a module for forwarding the vouching information to the first server; and
a module receiving the requested content from the first server.

13. The medium of claim 9, if the user is not authenticated to the second server:
a module for collecting the login information; and
a module for forwarding the collected login information to the second server.

14. The medium of claim 13, if the user is not authenticated to the second server, the fourth module comprising:
a module for receiving an acknowledgment that the user has been authenticated to the second server.

15. The computer of claim 14, if the user is not authenticated to the second server, the fourth module comprising:
a module for issuing a request to the second server for vouching information for authenticating the user to the first server;
a module for receiving the vouching information;
a module for forwarding the vouching information to the first server; and
a module for receiving the requested content from the first server.

16. The medium of claim 9 wherein all communication to and from the first and the second servers during user authentication occur through a computer system of the user.

\* \* \* \* \*